United States Patent [19]
Genever-Watling et al.

[11] 3,856,201
[45] Dec. 24, 1974

[54] TEMPERATURE REGULATING CONTROL VALVE

[75] Inventors: David C. Genever-Watling, Forest Park; Howard B. Kast, Fairfield, both of Ohio

[73] Assignee: General Electric Company, Cincinnati, Ohio

[22] Filed: Sept. 5, 1972

[21] Appl. No.: 286,271

[52] U.S. Cl. .................................. 236/93, 251/35
[51] Int. Cl. ........................................ G05d 23/00
[58] Field of Search ........... 236/80, 93, 87, 54, 102; 71/365; 251/35, 39

[56] References Cited
UNITED STATES PATENTS

| | | | |
|---|---|---|---|
| 2,258,366 | 10/1941 | Otto | 236/82 |
| 2,798,689 | 7/1957 | Houghton | 236/80 X |
| 3,151,810 | 10/1964 | Puster | 91/366.5 X |
| 3,265,303 | 8/1966 | Harris | 236/80 |
| 3,727,837 | 4/1973 | Gazzera | 236/93 X |

Primary Examiner—Edward G. Favors
Attorney, Agent, or Firm—Derek P. Lawrence; Lee H. Sachs

[57] ABSTRACT

A thermal responsive fluid control valve is provided in which the thermal responsive element forms a portion of a control bleed loop around the main valve. The pressure of the fluid itself is used to provide a motive force for positioning a piston which controls the output of the valve. The pressure on one face of the piston is controlled by the thermal responsive element, but the thermal responsive element is not used to provide a mechanical load directly to the piston and, therefore, stresses normally associated with a thermal responsive element are substantially reduced. Feedback is provided between the piston and the thermal responsive element. Pressure limiting and pressure override features are also provided on the control valve, with these features being separate from the thermal regulating feature thereby avoiding normal instability tendencies associated with combined temperature and pressure regulators.

7 Claims, 4 Drawing Figures

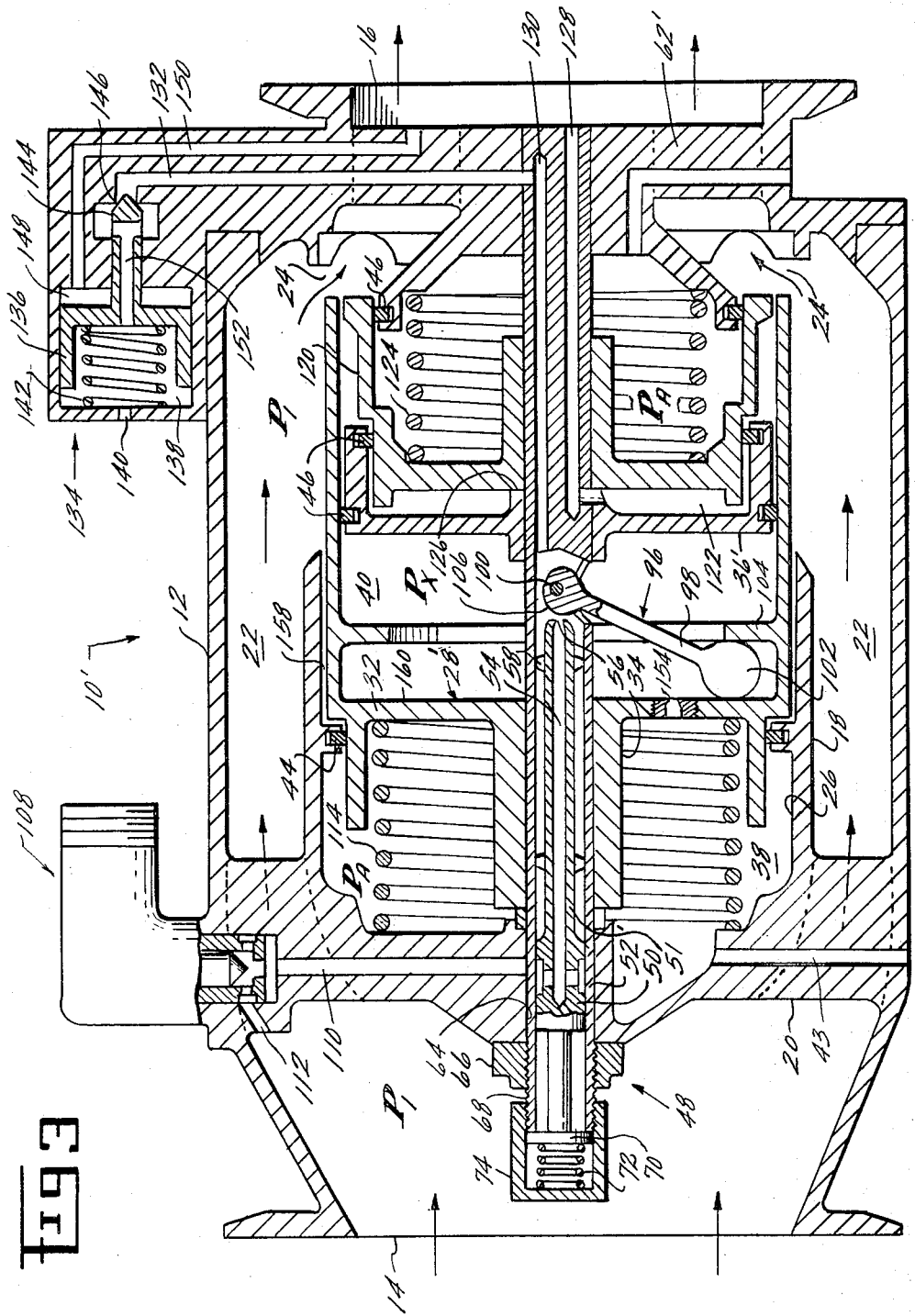

TEMPERATURE REGULATING CONTROL VALVE

The invention herein described was made in the course of or under a contract, or a subcontract thereunder, with the United States Department of the Air Force.

BACKGROUND OF THE INVENTION

This invention relates generally to high temperature gas control valves and, more particularly, to a valve of the type which is adapted to control high temperature air flow as a function of temperature with a pressure limiter or override incorporated therein.

Many devices require temperature sensitive control valves capable of controlling the flow of high temperature gases. As just one example, gas turbine engines use relatively high temperature and high pressure compressor discharge air to provide anti-icing functions both within the gas turbine engine and within the aircraft system itself. Compressor bleed air is also utilized to cool certain turbine components of a gas turbine engine. As any person knowledgeable in the gas turbine art is aware, any air which is bled from the compressor has detrimental effects on the overall performance of the engine. It is, therefore, highly desirable to accurately control the amount of compressor discharge air which is bled from the compressor. When the air is used for either anti-icing or cooling functions, as described above, it is further desirable that the flow of air be controlled as a function of the temperature of the air.

The historical approach to providing temperature sensitive flow regulation has been to use a bimetallic element as the temperature sensitive device and the motive force to control orifice area and, hence, regulate flow as a function of temperature. When large temperature ranges and large movements are required of such a flow control device, the associated stresses within the bimetallic device, the time constants, and potential inaccuracies make such an approach undesirable.

In addition, time constants involved with temperature sensitive devices usually require the incorporation of a pressure limiter control valve to avoid over-pressuring system elements downstream of the valve whenever the valve is subjected to widely varying pressures. When one attempts to combine such a pressure limiter or regulator with a temperature-sensitive control device using a bimetallic prime mover, however, the control valve tends to become unstable, bulky and heavier than desired.

SUMMARY OF THE INVENTION

It is a primary object of this invention, therefore, to provide a temperature responsive flow control device, which has a pressure regulator or override associated therewith and which is lighweight and compact. It is a further object of this invention to provide such a valve which has faster time constants than previously associated with such devices and which is usable over a wider temperature and flow range because stress levels in the temperature regulator are eliminated.

The above and similarly related objects are attained in the present instant by providing a flow control valve which utilizes a piston to define the variable flow control orifice, which piston is positioned by pressure balance as a function of temperature by a temperature sensitive control servo. The servo senses temperature from a control bleed loop around the main valve, which loop is open at any time an on/off valve control signals the valve to open. In this manner an area setting is achieved as a function of temperature using the fluid stream pressure as the motive force. The temperature sensitive servo control devices does not provide a direct mechanical force to the area setting piston and therefore is not loaded and unloaded during operation of the valve. Further the elements of the temperature sensing device are not constrained together, thus avoiding the stresses generated by differential strain. In this manner, all stresses and associated errors in temperature sensing with previous bimetallic devices are eliminated. Furthermore, because the area setting is achieved as a function of temperature completely independent of any action taken by the pressure limiting circuit, instability problems caused by the two regulators interfering with each other are avoided.

DESCRIPTION OF THE DRAWINGS

While the specification concludes with a series of claims which particularly point out and distinctly claim the subject matter of Applicants' invention, a clear understanding of the invention may be gained from the following description, which is given in connection with the accompanying drawings, in which:

FIG. 3 is an axial cross-sectional view of an alternative embodiment; and

DESCRIPTION OF A PREFERRED EMBODIMENT

Figure 1:
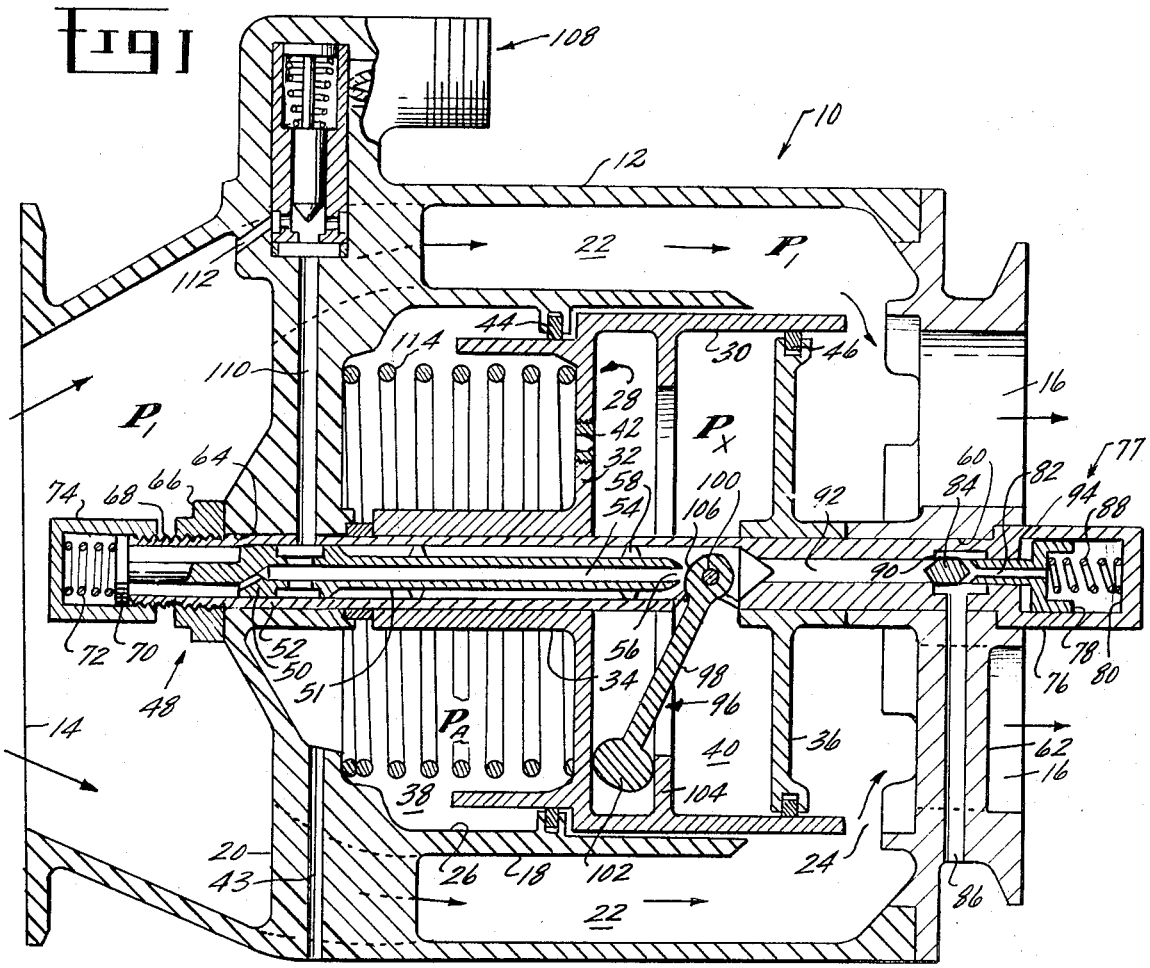
FIG. 1 is an axial cross-sectional, partially schematic view of one embodiment of Applicants' device.

Referring now to the drawings wherein the numerals correspond to like elements throughout, attention is directed initially to FIG. 1 in which a high temperature fluid control valve constructed in accordance with Applicants' invention is shown in simple schematic format and labeled with the numeral 10. The control valve 10 includes a generally cylindrical housing 12 which defines a circular inlet 14 at one end thereof and a circular outlet 16 at the opposite end thereof. A hollow cylinder 18 is supported internally of the housing 12 by one or more radial struts 20. The cylinder 18 cooperates with the housing 12 to define an annular chamber or passage 22 which provides for the flow of fluid from the inlet 14 to the outlet 16 through a variable flow orifice 24 located at one end of the passage 22.

The cylinder 18 also defines a piston chamber 26 internally of the annular passage 22. Located within the piston chamber 26 is a thermal regulating piston 28 which translates within the chamber 26 to positions in which the variable flow orifice 24 is either free to direct fluid from the passage 22 to the outlet 16 or is blocked to prevent the flow of fluid therebetween. The piston 28 comprises a hollow cylinder 30 which is closed at one end by means of an integral plate 32 from which extends a hollow piston bearing rod 34. A fixed cylindrical plate 36 is located within the hollow cylinder 30 at the end thereof opposite from the rod 34. The piston 28 and the cylindrical plate 36 cooperate to form two independent pressure chambers 38 and 40 within the piston chamber 26. An orifice 42 located within the plate 32 permits fluid to flow between chambers 38 and 40, while a passageway 43 reduces the pressure within the chamber 38 to ambient pressure.

Suitable sealing members 44 and 46 are positioned within the hollow cylinder 18 and the hollow cylinder 30, repectively, to prevent the flow of fluid between the respective chambers. The configuration and material of the sealing members will depend on the fluid involved as well as the condition of that fluid, and under some circumstances may not be required.

Located within the housing 12 and supported thereby in a suitable manner is a temperature responsive servo mechanism generally labeled 48 which acts to control the pressure within the pressure chamber 40 in a manner to be described. In the present instance, the temperature responsive servo 48 takes the form of a device which includes a high thermal expansion element 50 and a low thermal expansion element 52. The high expansion element 50 comprises a hollow rod 51 which provides a fluid passage 54 having a nozzle or orifice 56 at one end thereof. The rod 51 includes a plurality of protruding lugs 58 on the outside thereof which also generally comprises a hollow rod.

The low thermal expansion element 52 fits within an opening 60 formed within a radial strut 62 located within the outlet 16 of the housing 12. The strut 62 may be formed integrally with the housing 12. Near its opposite end, the element 52 fits within an opening 64 formed within the radial strut 20. The element 52 is then held in place by means of a nut 66 which engages a threaded portion 68 formed on one end of the element 52.

As previously mentioned, the high thermal expansion element 50 fits within the low thermal expansion element 52. To accurately position the element 50, the element 50 is provided with an enlarged head portion 70 which abuts the threaded end 68 of the element 52. If necessary, the head portion 70 may be held tightly against the element 52 by means of a spring 72, which is captured between the head portion 70 and a cap 74 which engages the threaded end 68 of the element 52.

The opposite end of the low thermal expansion element 52 includes an enlarged portion 76 which abuts the radial strut 62. Located within the enlarged portion 76 is a pilot valve 77 which includes a pressure regulating piston 78 which slides within a piston chamber 80 formed internally of the enlarged portion 76. The chamber 80 is vented to ambient pressure by means of a passage 82 formed through a rod portion 84 of the piston 78 and a passage 86 formed through the radial strut 62.

The pressure exerted by ambient air and by a spring 88 maintains the pilot valve 77 in position shown in FIG. 1 such that the rod portion 84 thereof seals an orifice 90. The orifice 90 lies at one end of passageway 92 which extends from the pressure chamber 40 through the low thermal expansion element 52. The rod end of the piston chamber 80 is pressurized by means of a small passageway 94 located just downstream of the outlet 16. Thus, when the pressure of the fluid exiting through the outlet 16 reaches a level high enough to overcome the pressure exerted by the ambient air and the spring 88, the pilot valve 77 will move to the right off its seat, opening the orifice 90 and venting the pressure chamber 40 to atmosphere through the passage 86. The pressure at which the pilot valve 77 will open can be adjusted by varying the size of the piston 78 and the spring 88.

As further shown in FIG. 1, the fluid control valve 10 is provided with negative feedback means 96 which provides a precise feedback of the position of the piston 28 to the thermal regulating servo 48. As shown, the negative feedback means comprise a lever 98 which pivots about a pivot point 100 formed on the low thermal expansion element 52. An enlarged portion 102 of the lever 98 fits between the plate 32 and a radial lip 104 formed integrally with the piston 28. In this manner, movement of the piston 28 causes the lever 98 to pivot about the pivot point 100.

Figure 2:
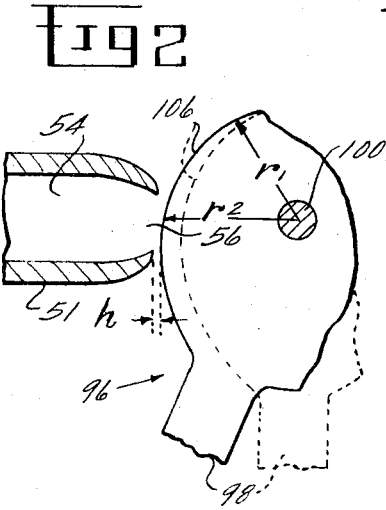
FIG. 2 is an enlarged, partial view of portions of FIG. 1.

As shown most clearly in FIG. 2, the lever 98 is provided with a cam surface 106, which lies immediately adjacent to the nozzle or orifice 56 of the rod 51. The cam surface 106 is contoured such that a gap $h$ between the orifice 56 and the cam surface 106 varies as the lever 98 pivots about the pivot point 100, e.g., from the solid to the phantom position shown in FIG. 2. To accomplish this, the lever 98 is provided with an increasing radius $r$ from the pivot point 100 to the cam surface 106. Because the lever 98 pivots about the pivot point 100 as the piston 28 moves within the piston chamber 26, each position of the piston 28 will provide a different gap $h$ between the nozzle 56 and the cam surface 106. Since the gap $h$ is at all positions smaller than the area of the nozzle 56, the gap $h$ is a direct controlling function of the position of the piston 28. That is, the pressure in chamber 40 is controlled by the gap between the nozzle 56 and the cam surface 106. In addition, the position of the piston, and, hence, the cam 106, establishes a means of nulling out a clearance change, between nozzle 56 and cam 106, which will occur as a function of temperature by differential expansion of the two thermal elements 52 and 50.

On and off operation of the valve 10 is controlled by means of a solenoid valve 108, which opens and closes a control bleed loop and which will now be described in connection with the overall operation of the valve 10. The solenoid valve 108 is normally in a closed position such that air entering the inlet 14 cannot pass through a passage 110 in the radial strut 20. When activated, the solenoid 108 opens and air flows through inlet passage 112 and the passage 110 to the center of the high thermal expansion element 50. At this point in time, the piston 28 is in its closed position due to the spring force exerted by a spring 114 located within the pressure chamber 38. When the air flows through passage 110 and through the center of the rod 51, the air exits through the nozzle 56 into the pressure chamber 40. The pressure chamber 40 is thus pressurized to a level $P_x$, which lies between an inlet pressure $P_1$ and ambient pressure and which is a function of the gap $h$ and the area of the orifice 42. Once the pressure within the pressure chamber 40 reaches a level sufficiently high to overcome the force of the spring 114 and the ambient pressure within the chamber 38, the piston 28 will move to the left thereby opening the variable flow orifice 24. Fluid entering the inlet 14 will then pass through the annular passage 22 and the variable flow orifice 24 to the outlet 16. Thus, the pressure of the fluid entering the inlet 14 has been utilized to provide the motive force for moving the piston 28 and opening the valve 10.

As the fluid flows through the control bleed loop and, in particular, through the high thermal expansion element 50, the rod 51 will expand with respect to the element 52 and will cause the gap $h$ (as shown in FIG. 2) to close. Closure of this gap will cause the flow through the orifice 56 to drop and will result in a reduction in the pressure within the pressure chamber 40 enabling the piston 28 to move to the right and thereby restrict the variable flow orifice 24. In so moving, the piston 28 will cause the lever 98 to pivot about the pivot point 100 whereby the gap $h$ between the cam surface 106 and the orifice 56 will increase. The net effect of this action will be adjust the gap $h$ to a position such that equilibrium is achieved when the piston 28 has set the required area at the orifice 24 for the actual temperature of the fluid flowing through the inlet 14. This area setting has been achieved by utilizing the pressure of the fluid as the motive force in such a manner that the thermal servo mechanism 48, which controls this pressure, is not directly transmitting a load to the flow regulating mechanism, but instead forms a portion of a control bleed loop around the valve. In this manner, the stresses within the thermal servo meachnism 48 are maintained at very low levels.

Should the piston 28 stick toward the open position during operation of the valve 10, the gap $h$ will get continuously smaller until full spring force is available to move the piston 28. As soon as the piston moves, the negative feedback means 96 will increase the gap $h$ thereby removing the high force level and achieving equilibrium at the required area. The same is true for the piston stuck too far closed, but in this instance an increasing pressure in the chamber 40 will provide the repositioning load until nulled by the piston moving to the correct position.

As described above, the valve 10 provides a completely workable thermal responsive device which is capable of controlling the flow of fluid as a function of the temperature of the fluid. In many applications, however, the pressures of the fluid are such that hardware located downstream of the valve is incapable of accepting the full pressure range of the fluid. Do to the fact that any thermal control device must embody a time constant, however small, during rapid transient operation undesirable pressures may be permitted to reach downstream hardware. For this reason, the control valve 10 may be equipped with pressure regulating means in the form of the pilot valve 77 previously described. The pressure regulating means will provide an instantaneous control of downstream pressure during rapid transients and will control downstream pressure at a level nominally higher than that set when the thermal regulator is on schedule point.

Once the thermal regulating servo is near its schedule point and calling for an area at orifice 24 less than being set by the pressure regulating means, the temperature regulating servo will override the pressure regulating means as described below.

During rapid transient operation the piston 78 will sense the pressure, exiting through the valve outlet 16, across its rod end area by virtue of the passageway 94. The piston 78 will then operate to open the orifice 90 and fluid will be vented from the pressure chamber 40 through the passageways 92 and 86. As the pressure within the pressure chamber 40 drops, the spring force of the spring 114 and the ambient pressure within the pressure chamber 38 will act on the piston 28 to close the variable flow orifice 24. This will result in a decreasing downstream pressure. By properly designing the areas of the piston 78 and the size of the spring 88, the downstream pressure can be limited to any desired pressure.

Thus, in the simple form shown in FIGS. 1 and 2, the control valve 10 operates to control the amount of fluid delivered to downstream hardware as a function of the temperature of the fluid entering the valve. In addition, the valve 10 is capable of limiting the downstream pressure to any desired value. When an operator desires to stop the flow of fluid entirely, all that need be done is to close the solenoid valve 108 at which time the flow of fluid through the bleed loop, i.e., the passageway 110, the high thermal expansion element 50, etc., will cease. The pressure within the pressure chamber 40 will then drop to a sufficiently low level such that the spring force of the spring 114 will act upon the piston 28 to close the variable flow orifice 24.

Referring now to FIG. 3, an alternative version of a gas valve embodying Applicants' invention is designated by the numeral 10'. Insofar as the thermal control mechanisms are concerned, the fluid control valve 10' is identical to the valve 10 shown in FIGS. 1 and 2. That is, the valve 10' again includes the thermal regulating piston 28 located within the piston chamber 26 formed by the housing 12. Fluid again flows through the inlet 14, the annular passage 22, and the variable flow orifice 24 to the circular outlet 16. The position of the thermal regulating piston 28 is again controlled as a function of the temperature of fluid flowing through the inlet 14 by operation of the solenoid valve 108, which opens the passage 110 to the center of the high thermal expansion element 50. The flow of fluid through the orifice 56 again pressurizes the pressure chamber 40 and positions the piston 28.

The control valve 10' differs from the valve 10 in that an additional pressure regulating or control piston 120 is located within the piston 28. The pressure regulating piston 120 cooperates with a fixed cylindrical plate 36' to define an additional pressure chamber 122 between the pressure chamber 40 and the outlet 16. A spring 124 exerts a force on the piston 120 to maintain the piston 120 in a normally open position shown in FIG. 3 in which it abuts against a stop 126 formed by the cylindrical plate 36'.

As further shown in FIG. 3, the low thermal expansion element 52 of FIG. 1 is replaced by a low thermal expansion about element 52' which includes a pair of passageways 128 and 130 therein. The passageway 128 opens on one end to the outlet 16 and on the other end to the chamber 122. In this manner, fluid flowing through the outlet 16 pressurizes the chamber 122. Similarly, the passage 130 lies in fluid flow communication with the pressure chamber 40 and with a passage 132 which extends through a radial strut 62'.

The passage 132 extends to a secondary pressure override system 134 which includes a pilot valve 136 located within a chamber 138 which is vented to atmosphere through an orifice 140. A spring 142 acts to maintain the pilot valve 136 in a position wherein a rod portion 144 thereof closes an orifice 146 at the end of passage 132. A chamber 148 formed at the rod end of the pilot valve 136 is placed in fluid flow communication with the outlet 16 by means of a passageway 150 which extends through the strut 62', while a passageway 152 extends through the rod portion 144 of the valve as shown.

The operation of the control valve 10' is similar to the valve 10 in that the solenoid valve 108 opens a control bleed loop to permit the fluid entering the inlet 14 to pressurize the pressure chamber 40 through the passageway 110 and the center of the rod 51. When the pressure within the chamber 40 reaches a certain level, the pressure acting on the piston 28 will overcome the spring force of the spring 114 and will open the variable flow orifice 24 to its full open position. As this occurs, the valve downstream pressure will start to rise. At the point where the downstream pressure reaches a sufficiently high level, e.g., 8 psi above the primary temperature regulation pressure, the piston 120 will partially close to limit downstream pressure to this desired value. In a typical case, this downstream pressure may be 45 psi. The piston 120 is direct acting using ambient pressure plus the spring force of the spring 124 on one side balanced by the downstream pressure on the other side, as the downstream pressure is supplied to the chamber 122 through the passageway 128. The valve 10' thus opens almost instantly upon actuation of the solenoid 108 and permits flow through the outlet 16 below a desired downstream pressure.

During this time period, the rod 51 has been increasing in length due to the temperature rise associated with the flow of air through the center thereof and is now restricting the gap $h$. The pressure in the pressure chamber 40 will then reduce (as fluid bleeds through an orifice 154 to the chamber 38) to the point that the fully compressed spring 114 will overcome the pressure force and the piston 28 will move toward its closed position. In so doing, the cam surface 106 on the lever 98 will adjust the orifice to a position such that equilibrium is again achieved when the piston 28 has reached the required area setting for the inlet fluid temperature.

Having thus established the piston 28 at the required position on the primary temperature schedule, which, for example, may result in a downstream pressure of 37 psi, the spring 124 in front of the piston 120 will overcome the pressure within the chamber 122 and return the piston 120 to its full open position against the stop 126.

The pressure limiting piston 120 is provided to preclude downstream pressure from rising above a desired limit in spite of rapid changes in inlet pressure. In certain applications, the redundant pressure limiter 134 may be provided to limit downstream pressure should the piston 120 fail to do so during rapid changes in pressure. In such a case, the pilot valve 136 and the spring 142 are designed such that when the downstream pressure reaches a certain limit, e.g., 50 psi, the force exerted on the valve 136 within the chamber 148 is sufficient to open the valve at the orifice 146. When this happens, the pressure within the pressure chamber 40 is dumped to atmosphere through the passages 130, 132, 152 and the orifice 140. As this occurs, a spring force exerted by the spring 114 will be sufficient to overcome the pressure within the chamber 40 and the piston 28 will move to close the variable flow orifice 24 thereby limiting the downstream pressure to a maximum of 50 psi.

As shown in FIGS. 1 and 3, the valves 10 and 10' are sensitive to both the temperature and the pressure of the fluid flowing therethrough. That is, the temperature of the fluid controls the gap $h$ and hence $P_x$, the pressure within the pressure chamber 40, as described above. Similarly, if the temperature of the fluid remains constant but the inlet pressure $P_1$ changes, the pressure $P_x$ will also change as $P_x$ is related to $P_1$. For example, $P_x$ may have the following relationship with respect to $P_1$: $P_x = 0.40\ P_1$. Since $P_x$ acts directly on one face of the piston 28, and thus controls the position thereof, should the inlet temperature remain constant while the inlet pressure changes, the flow through the orifice 56 will change accordingly and reposition piston 28.

Figure 4:
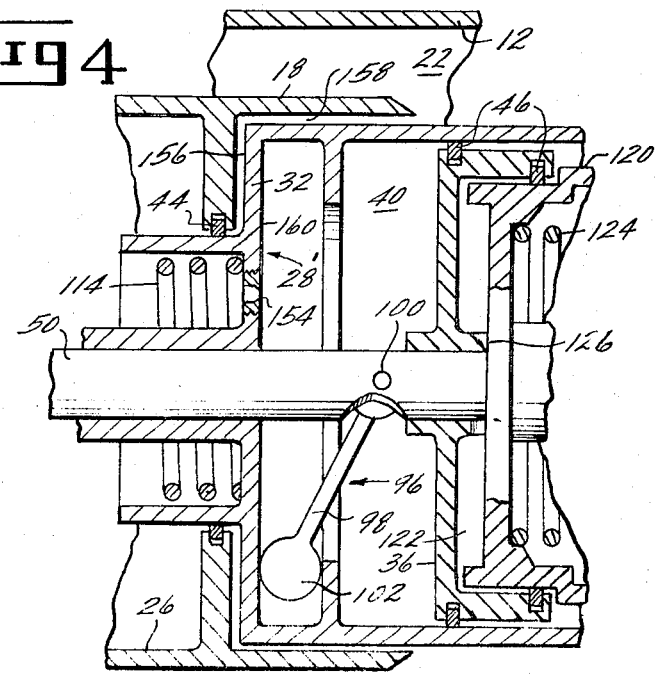
FIG. 4 is an axial cross-sectional view, with portions deleted, of another alternative embodiment.

If desired, the valves 10 and 10' may be modified slightly to make them insensitive to changes in inlet pressure. That is, as shown in FIG. 4, the diameter of the seal member 44 may be reduced such that an upstream pressure force is exerted on the piston 28 to null the changes in $P_x$ as a function of changes in inlet pressure. That is, by reducing the diameter of the seal member 44, a modified piston 28' is provided. An annular face 156 of the piston 28' is pressurized with upstream pressure $P_1$ by means of the annular passage 22 and annulus 158 (FIGS. 3 and 4). This pressure force opposes the pressure force exerted by $P_x$ on face 160 of the piston 28'. Knowing the relationship of $P_1$ and $P_x$, forces on the piston 28' due to changes in $P_1$ may be completely counterbalanced by properly sizing the annular face 156.

In face, the valve may be designed to respond in any desired manner to changes in inlet pressure by merely varying the position of the sealing element 44. If a valve is desired which will open further with increasing inlet pressure (constant temperature), the sealing member 44 is positioned as shown in FIGS. 1 and 3. If a valve is desired which is relatively insensitive to changes in inlet pressure (constant temperature), the sealing member 44 is positoned as shown in FIG. 4 wherein the changing pressure forces exerted on face 156 counterbalance those exerted on face 160. By varying the differential areas of the face 156 relative to the face 160, and the size of orifices 56 and 154, a valve may be constructed which responds negatively to changes in inlet pressure, i.e., closes further as inlet pressure increases.

In addition to being able to vary the pressure sensitivity of the valve, the thermal area schedule may also be varied merely by changing the shape of the cam surface 106. The surface 106, as described above, cooperates with the orifice 56 to provide a gap $h$ which is a controlling parameter for $P_x$. Since $P_x$ determines the position of the piston 28, by changing the design of the cam surface 106, the relationship of $P_x$ to the inlet temperature may be varied. In this manner, the temperature area schedule of the valve may be varied.

As described above, Applicants have provided a new and a unique fluid control which is capable of controlling the flow of fluid as a function of the temperature of the fluid alone or of the temperature and pressure of the fluid, or of the temperature alone with a pressure override. Applicants' valve is capable of providing these functions at much lower time constants than previously associated with thermal responsive valves because the thermal responsive device is not used to provide a direct mechanical load to the control elements of the valve and therefore can have a very much lower thermal mass. Since the stress levels in the thermal responsive device are thus maintained at low levels, Applicants' valve is also capable of use over much wider temperature ranges than previous thermal responsive valves. In addition, Applicants have provided a much more accurate thermal responsive device due to the fact that the thermal responsive element forms portion of a closed loop control which includes a negative feedback on position and which includes high force margins due to the use of the pressure of the fluid as the motive force. Furthermore, instability tendencies normally associated with thermal and pressure sensitive devices, when combined, are eliminated in Applicants' valve because thermal responsive elements form a control bleed loop around the main valve and thus are not sensitive to changes in flow through the main valve. This bleed loop is provided with continuous flow therethrough whenever the valve is signaled "on" by means of an on/off control.

While a number of alternative embodiments of Applicants' device have been shown and described above, these embodiments are not intended to be all-inclusive. Slight modifications may be made to these embodiments by those skilled in the art without departing from the broad inventive concepts described by Applicants. For example, the embodiments described above are intended primarily for use with high temperature air or gases. Slight variations in positions of the seals, bleed passages, orifices, etc. would normally be made if the valve is intended for use in controlling a liquid. These modifications clearly fall within the broader inventive concepts taught by Applicants. Similarly, in many instances, the pressure override systems described above may not be required. These features may be eliminated from the above embodiments without departing from the broad inventive concept. In addition, the negative or nulling feedback taught by Applicants may be replaced with a positive feedback if so desired. As another example, the thermal regulating pistons shown in each embodiment may in certain applcations be replaced with an alternative pressure responsive device such as a bellows. The appended claims are intended to cover these and similar modifications to Applicants' device.

What we claim is:

1. A high temperature fluid control valve consisting of
   a housing defining an inlet, an outlet, and a first piston chamber;
   a thermal regulating piston positioned within said chamber, said piston cooperating with said housing to define a variable flow orifice between said inlet and said outlet;
   a temperature responsive servo for controlling the pressure on a first face of said piston, said servo forming a portion of a mechanically unloaded control bleed loop around said variable flow orifice, and feedback means connected between said piston and said servo.

2. A control valve as recited in claim 1 wherein the pressure of the fluid acts as the prime motive force for positioning said thermal regulating piston.

3. A control valve as recited in claim 2 wherein said thermal regulating piston is insensitive to the pressure of the fluid at the inlet of the valve.

4. A control valve as recited in claim 1 wherein said bleed loop includes an on/off control valve and said bleed loop continuously flows fluid when said on/off valve is open.

5. A control valve as recited in claim 1 wherein said temperature responsive servo includes a pair of differential expansion elements adapted to receive fluid from said inlet and to deliver fluid to said first face of said piston.

6. A control valve as recited in claim 5 wherein one of said expansion elements comprises a hollow rod having a nozzle at one end thereof, said feedback means includes a cam surface which lies immediately adjacent said nozzle, and said rod and said cam surface cooperate to define a variable gap $h$ adapted to receive fluid passing through said nozzle.

7. A control valve as recited in claim 6 wherein said gap $h$ is always smaller than the area of said nozzle and said gap $h$ is a direct controlling function of the position of said thermal regulating piston.

* * * * *